United States Patent

[11] 3,577,158

| [72] | Inventor | Linus K Hahn<br>Columbus, Ohio |
| --- | --- | --- |
| [21] | Appl. No. | 792,201 |
| [22] | Filed | Jan. 7, 1969 |
| [45] | Patented | May 4, 1971 |
| [73] | Assignee | Industrial Nucleonics Corporation<br>Continuation of application Ser. No.<br>522,778, Jan. 24, 1966, now abandoned. |

[54] MASS FLOW RATE MEASURING UTILIZING THE SCATTERING CROSS-SECTION OF A MATERIAL FOR FAST NEUTRONS
17 Claims, 2 Drawing Figs.

[52] U.S. Cl.................................................. 250/43.5, 250/83.1
[51] Int. Cl........................................................ G01n 23/12
[50] Field of Search......................................... 250/43.5 (FC), 43.5 (D), 43.5 (R), 83.1

[56] References Cited
UNITED STATES PATENTS

| 2,640,936 | 6/1953 | Pajes............................ | 250/43.5 |
| --- | --- | --- | --- |
| 2,841,713 | 7/1958 | Howard........................ | 250/43.5 |
| 2,873,377 | 2/1959 | McKay.......................... | 250/43.5 |
| 3,239,663 | 3/1966 | Oshry et al.................... | 250/43.5 |
| 3,255,975 | 6/1966 | Malin et al..................... | 250/43.5 |
| 2,873,377 | 2/1959 | McKay.......................... | 250/43.5D |
| 2,640,936 | 6/1953 | Pajes............................ | 250/43.5FCX |
| 2,842,713 | 7/1958 | Howard........................ | 250/43.5FC |
| 3,239,663 | 3/1966 | Oshry et al.................... | 250/43.5D |
| 3,255,975 | 6/1966 | Malin et al..................... | 250/43.5DX |

*Primary Examiner*—Archie R. Borchelt
*Attorney*—William T. Fryer, III

ABSTRACT: Measuring mass flow rate of a fluid material having a high scattering cross section for fast high energy neutrons by radiating the material with such neutrons which are slowed to lower energy thermal neutrons and detecting the thermal neutrons downstream to effect a determination therefrom of the mass flow rate. For a more accurate determination of the mass flow rate, a second thermal neutron detector downstream has its output compared to the first detector output. Further, a gamma source and detector is employed to derive the density of the material and to obtain the velocity thereof by division of the mass flow by the density.

PATENTED MAY 4 1971 3,577,158
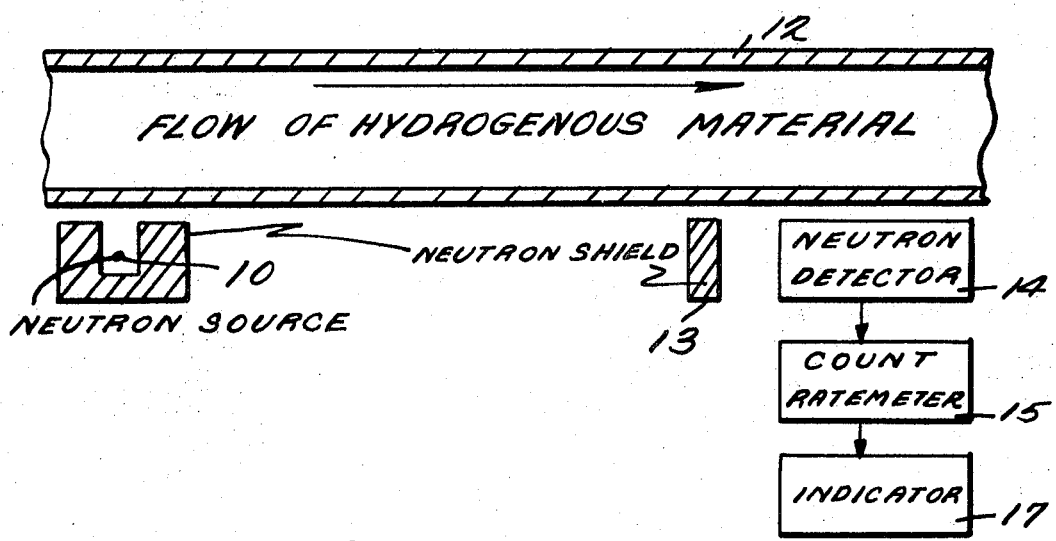
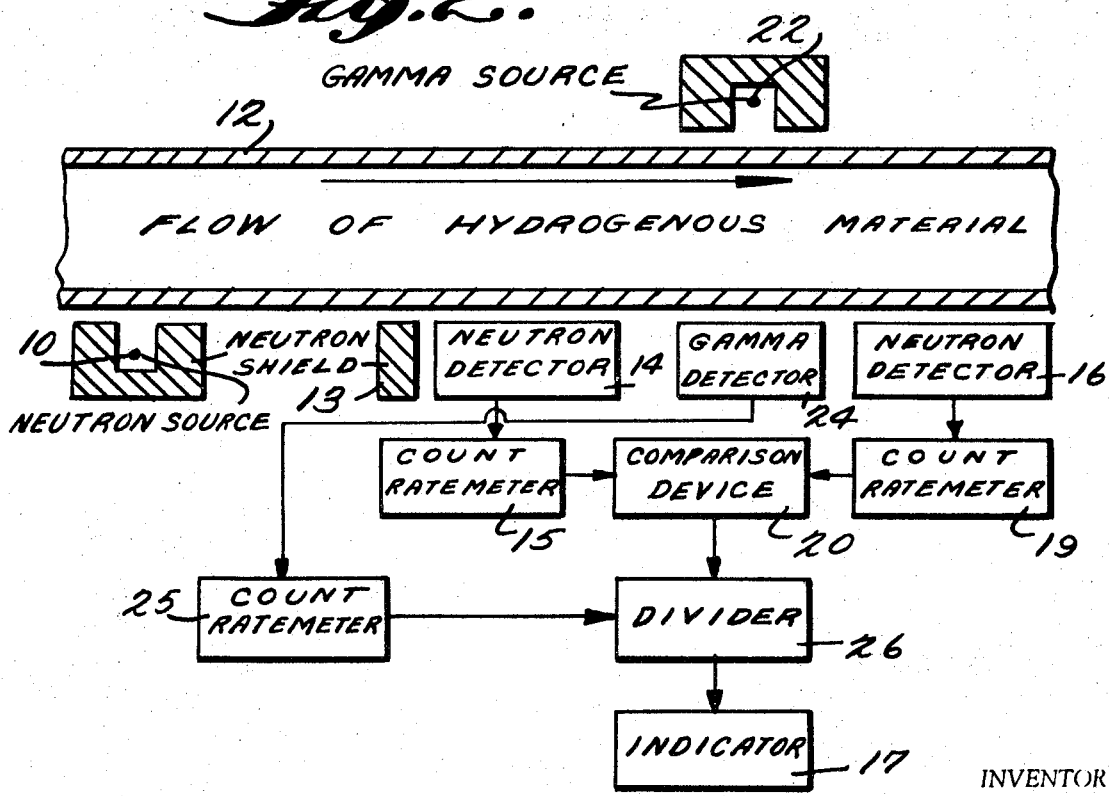
INVENTOR
LINUS K. HAHN
BY Cushman, Darby & Cushman
ATTORNEYS

MASS FLOW RATE MEASURING UTILIZING THE SCATTERING CROSS-SECTION OF A MATERIAL FOR FAST NEUTRONS

This application is a continuation of application Ser. No. 522,778, filed Jan. 24, 1966, now abandoned, entitled Neutron Mass Flowmeter.

This invention relates to a method and apparatus for measuring the mass flow rate of a fluid material—that is, a gas or a liquid. In particular, this invention relates to a mass flow rate measuring method and apparatus for fluids having a high scattering cross section for fast neutrons.

This invention, in one of its typical uses, accurately measures the mass flow rate of a fluid within a pipe or conduit by simple and economical means, where the fluid has a high scattering cross section for fast neutrons. Such materials are typically hydrogenous and in particular this includes the organic materials. Since the proton is essentially the same size as the neutron, hydrogenous materials are eminently well suited for scattering and thermalizing fast neutrons.

Accordingly, it is an object of this invention to provide an improved method and apparatus for measuring the mass flow rate of a hydrogenous or similar fluid.

It is another object of this invention to provide an improved method and apparatus for introducing fast neutrons into a hydrogenous or similar fluid to determine the mass flow rate thereof.

Briefly, the above objects are accomplished by providing a source of fast, high energy neutrons which radiates the measured material with these neutrons as the material passes a first point. At a second point the lower energy neutrons, resulting from the fast neutrons being slowed down by the material, are detected. A determination is then made of the mass flow rate in response to the detected lower energy neutrons.

Other objects and advantages of this invention will become apparent to one of ordinary skill in the art upon reading the appended claims and the following detailed description of an illustrative embodiment of the invention, in conjunction with the drawing in which:

FIG. 1 is a diagrammatic representation of one illustrative embodiment of the invention; and FIG. 2 is a diagrammatic representation of an illustrative embodiment for improving the results obtained by the embodiment in FIG. 1.

A source 10 of fast or high energy neutrons is disposed adjacent to the conduit 12 in which flows a fluid having a high scattering cross section for the fast or high energy neutrons generated by source 10. This neutron source is conventionally arranged to introduce a narrow beam of continuous radiation into the fluid flowing thereby and may be concentric with respect to conduit 12. A typical source suitable for the purposes of this invention would be a radium-beryllium pellet or a neutron generator producing neutrons in the MEV range, for example. A detector means 14 is also disposed adjacent to the conduit 12 downstream with respect to the neutron source 10. This detector is responsive primarily to lower energy neutrons, to epithermal and thermal neutrons and also to a much less extent, to slow neutrons, which are transmitted from the fluid as it flows by detector 14. This detector may be of any conventional type and may be concentric with respect to the conduit 12. For example, a neutron BF3 detector may be used. In such a detector a boron nucleus is struck by a neutron to form an alpha particle and a Lithium atom. The $\alpha$ particle is then detected and registered on a suitable count ratemeter 15. The output from the count ratemeter may be an analog signal representative of the count rate of the pulses applied thereto. This output is applied to a suitable indicator 17, which is calibrated to provide the desired mass flow rate indication.

The text books do not agree entirely as to the energy ranges for fast, high energy, slow, epithermal, and thermal neutrons. The present invention is not limited to exact ranges, since the detector 14 need be constructed only to be sensitive primarily to epithermal and thermal neutrons, for the desired sensitivity to mass flow rate. As an example, the text "Introduction to Neutron Physics," by L. F. Curtiss, 1959, p. 17, describes thermal neutrons as fast neutrons slowed down until the average energy of neutrons is equal to the average energy of the atoms of the medium. The distribution above thermal neutron energy, as the neutrons are progressively slowed, is referred to as epithermal and the neutrons as epithermal neutrons.

The detection of thermal and epithermal neutrons is very efficient and sensitive to changes in mass flow rate, because of their high detection cross sections and the detectors available. Slow neutrons are more difficult to detect.

Source 10 can produce a series of fast neutron radiation pulses at a constant frequency, instead of a continuous beam. A rotating shutter can be used to cut off the neutron beam. Detector 14 would be arranged to receive the lower energy neutrons (primarily thermal and epithermal). The measuring circuit connected to detector 14 would measure the detector signal amplitude, being a function of the number of lower energy neutrons received, to indicate the mass flow rate.

A shield 13 is interposed between source 10 and detector 14 to insure isolation of the detector from direct radiation of the source 10. This shield may typically be made out of cadmium, or boron, or any other material suitable for attenuating and absorbing fast neutrons.

In FIG. 2, a further detector 16 may be employed in the invention. This detector is utilized to provide an enhancement or improvement of the mass flow determination made by the detector 14. The signal representing a determination of the mass flow rate as produced by detector 14 is fed to a first count ratemeter 15, as described above. The analog output signal from meter 15 is fed to a first input terminal of a comparison device 20. The further determination of the mass flow rate as produced by detector 16 is fed to a second count ratemeter 19. The analog output signal from ratemeter 19 is fed to a second terminal of the comparison device 20. The comparison device 20 may be constructed in any of many well-known arrangements. The output from device 20 is a more accurate determination of the mass flow rate with respect to the flow rate as determined by detector 14, the more accurate determination being a function of the determination made by detector 14 and the further determination may be detector 16.

As implied above, the determination made by detector 14 of the mass flow rate can be used by itself without further enhancement thereof if the particular application so warrants.

A suitable source 22 and detector 24 of gamma rays or other radiation may also be oppositely disposed adjacent the conduit 12, at any desired location, to provide a density measurement of the material in the conduit. By dividing, by a divider 26, the mass flow measurement by the density measurement, the velocity of the fluid can be determined. The output from detector 24 is fed to a count ratemeter 25, the output of which is fed as one input to the analog divider 26.

The system of FIG. 2 can be operated using a continuous or pulse source 10. The pulse source would require only the addition of a time delay circuit for the signal from detector 14 to compare the pulse in comparison device 20 at the same time.

The operation of the invention is as follows:

Referring to FIG. 1, the neutron source 10 emits neutrons having an average energy of several million electron volts (MEV), for example. As this source is disposed adjacent to and directed toward the conduit, neutrons are introduced into the fluid (which is assumed, for the sake of illustration, to be an organic material) within the conduit 12. The neutrons entering the device undergo scattering (and also absorption) interactions until some of them are eventually slowed down to the range of epithermal and thermal levels. The slowing down processes are typically due to the material having a high scattering cross section with respect to fast neutrons (that is, neutrons having an average energy of, at least, several million electron volts). In an organic fluid this would be typically due to the hydrogen atoms. For example, about one scattering interaction with a hydrogen atom and about 18 scattering interactions with a carbon atom, on the average, are needed to thermalize the neutrons. If the fluid is not moving with respect to the source 10 (and therefore the detector), the thermal and epithermal neutrons would have a certain distribution within the substance, and would not be well detected by the detector 14 placed at a sufficient distance from the source 10. If the fluid is moving along the pipe toward the detector, then the detector 14 senses and measures the thermal and epithermal neutrons. Detector 14 should be positioned along the length of the conduit 12 for maximum sensitivity, i.e., where the rate of change of the lower energy neutrons is greatest for a given change in mass flow rate.

Thus, the count rate from the detector 14 is a function of the product of the hydrogen density (and to a less extent the carbon density) and the velocity with which the substance flows through the pipe. Thus, the count rate is related to the mass flow rate.

The pulse output of detector 14 may be applied to count ratemeter 15 of suitable design, the output of which is an analog signal having an amplitude proportional to the rate of occurrence of pulses supplied thereto. Of course, in many industrial processes, mass flow rate is an important parameter which must be carefully controlled to optimize the particular process; therefore, the output from detector 14 or meter 15 may control appropriate apparatus for regulating the mass flow rate.

Referring to FIG. 2, when a more accurate determination of the mass flow rate is required, the second detector 16 is employed. This detector is placed an appreciable distance from the detector 14 to insure an appreciably different measurement than that provided by detector 14. Since the number of epithermal and thermal neutrons in the fluid flowing within the conduit 12 decreases with respect to time, the farther away detector 16 is from detector 14, the smaller the signal generated by the detector 16. Thus, the signal generated by the detector 16 contains additional information on the flow rate of the fluid, as the distance between the detectors 14 and 15 is constant. For example, if the population of epithermal and thermal neutrons decreases to one-half its original number in $x$ seconds and if the velocity of the fluid were $x$ feet per second, then the signal generated by detector 16 should have a count rate one-half that generated by detector 14 if the detector 16 is spaced $x$ feet away from detector 14. Therefore, the ratio of the signal level at detector 14 to the signal level at detector 16 would provide a signal representative of the mass flow rate of the material. The rate of population decrease as a function of time can be determined before a measurement is made, and therefore the comparison device 20 may be calibrated beforehand to reflect the particular material whose mass flow rate is being measured. As pointed out before, the output from the comparison device would provide an improved and accurate determination of the mass flow rate of the fluid with respect to the determination made by detector 14.

Gamma ray source 22 directs gamma rays into the fluid and the gamma ray detector 24 counts the photons transmitted through the fluid, the count rate being determinative of the density of the material flowing through the pipe. In order to provide a determination of the velocity of the material the output from the density detector 24 is fed to the count ratemeter 25, the analog output being fed to divider 26, which causes the mass flow indication provided from comparison device 20 to be divided by the density indication and therefore, provide an indication of the velocity of the fluid passing through the conduit 12.

Thus, there has now been described a mass flow measuring apparatus for fluid materials having a high scattering cross section to fast or high energy neutrons, said apparatus having the advantages set forth and accomplishing the objects indicated. The embodiments of the invention may be economically constructed and it lends itself to a wide variety of situations where a determination of mass flow rate or velocity of an organic or hydrogenous fluid is desired.

Other objects and advantages, and even further modifications of the invention, will become apparent to those of ordinary skill in the art upon reading this disclosure. However, it is to be understood that this disclosure is illustrative of the invention, and not limitative thereof, the invention being defined by the appended claims.

I claim:
1. Apparatus for measuring the mass flow rate of a fluid material subject to varying velocity and having a high scattering cross section for neutrons having an energy higher than thermal neutrons, the apparatus comprising:
   means disposed adjacent one point in the flow of said material for radiating said material with said higher energy neutrons, a significant number of which are slowed to lower energies by said material;
   means disposed adjacent another point in the flow of said material for detecting said lower energy neutrons;
   one of said points being downstream from the other; and
   means providing a calibrated indication of the mass flow rate of said fluid material in response to the number of said lower energy neutrons detected by said detecting means.

2. Apparatus as in claim 1 where said fluid flows in a conduit, said radiating means is disposed adjacent to said conduit, and said another point detecting means is disposed adjacent to said conduit downstream with respect to said radiating means.

3. Apparatus as in claim 1, wherein said lower energy neutrons are selected from the group consisting of epithermal and thermal neutrons.

4. Apparatus as in claim 1 where said material having a high scattering cross section for higher energy neutrons is organic.

5. Apparatus as in claim 1 including at still another point in the flow of said material further means responsive to said lower energy neutrons providing a further determination of said mass flow rate, and means for comparing the number of said lower energy neutrons detected as said one and said another point to provide an output signal, and means providing a calibrated indication of the mass flow rate of said fluid material in response to said output signal.

6. Apparatus as in claim 5 where said comparison means compares the ratio of said lower energy neutrons detected at said one and said another points, and said indication means is calibrated to indicate the mass flow rate of said fluid material.

7. Apparatus as in claim 5 where said further mass flow rate determining means is disposed adjacent to said conduit downstream with respect to said first-mentioned mass flow rate determining means.

8. Apparatus as in claim 1 including means for determining the density of said material and means for determining the velocity of said fluid as a function of said determinations of the mass flow rate and said density.

9. Apparatus as in claim 8, where said density determining means includes means for radiating said material with gamma rays and for detecting said gamma rays transmitted through the material to obtain a density responsive signal, and said velocity determining means divides a signal responsive to said detected neutrons with said density responsive signal, to indicate the velocity of said fluid material.

10. Apparatus as in claim 1 where said radiation source is continuous with respect to time.

11. Apparatus as in claim 1 where said radiation source is pulsed with respect to time.

12. The method of measuring the mass flow rate of a fluid material subject to varying velocity and flowing in a conduit, said material having a high scattering cross section for neutrons having an energy higher than thermal neutrons, comprising the steps of:
   radiating said material with said higher energy neutrons as it passes a first point along said conduit;
   detecting the lower energy neutrons at another point along said conduit which result from the said higher energy neutrons being slowed down by said material; and calibrating an indication of the number of said detected lower energy neutrons with the mass flow rate of said fluid material.

13. The method, as described in claim 12, wherein said lower energy neutrons are selected from the group consisting of epithermal and thermal neutrons.

14. The method as in claim 12 including the steps of:
   detecting the lower energy neutrons at a third point along said conduit;
   comparing the number of said lower energy neutrons detected at said second and third points; and
   calibrating an indication of said comparison with the mass flow rate of said fluid material.

15. The method as in claim 14 where said lower energy neutrons at said third point are selected from the group consisting of epithermal and thermal neutrons.

16. Apparatus as in claim 5 including means for determining the density of said fluid material and means for combining said density determination with said output signal to determine the velocity of said fluid material.

17. The method as described in claim 12 including the steps of:
   detecting the lower energy neutrons at a third point along said conduit; and
   measuring the density of said fluid material;
   combining signals responsive to said density measurement and number of neutrons detected at said second and third points to obtain an indication of the velocity of said fluid material.